INVENTOR.
VICTOR D. MOLITOR
BY
ATTORNEY

Feb. 6, 1962 V. D. MOLITOR 3,020,113
FOOD DISPLAY DEVICE
Filed March 17, 1958 6 Sheets-Sheet 5

INVENTOR.
VICTOR D. MOLITOR
BY
Horace B. Van Valkenburgh
ATTORNEY

Feb. 6, 1962  V. D. MOLITOR  3,020,113
FOOD DISPLAY DEVICE
Filed March 17, 1958  6 Sheets-Sheet 6

INVENTOR
VICTOR D. MOLITOR
BY
Horace B. Van Valkenburgh
ATTORNEY

United States Patent Office 3,020,113
Patented Feb. 6, 1962

3,020,113
FOOD DISPLAY DEVICE
Victor D. Molitor, Englewood, Colo.
(1318 10th St., Denver, Colo.)
Filed Mar. 17, 1958, Ser. No. 721,780
4 Claims. (Cl. 312—284)

This invention relates to an improved food display device and more particularly to a transparent sanitary cover for a food cart, tray or the like.

Many states, by law, require that food which is presented for selection by customers, in a public eating place, be covered and suitably protected, while the selection is made. This is a reasonable requirement, since the restaurant owner is normally charged only with the responsibility of employing persons free of contageous diseases, but there is no such control with respect to the customers. In dipsensing many foods, such as French pastries, salads and the like, it is common for the customer to make a selection of his choice from a tray or cart containing several varieties. In the case of salads, it is desirable tht a chef or waiter prepare the salad at the table, so that the customer may view the operation. Thus, the display of food for selection, as in a restaurant or the like, presents many problems in presenting the food for selection and protecting the unselected food from the customer, particularly against sneezing, coughing and the like by the customer, yet providing adequate visibility by the customer.

It is an object of this invention, therefore, to provide an improved food display device; to provide such a device which has improved sanitary functions; to provide such a device which protects the food displayed while providing undistorted visibility thereof; to provide such a device which includes a transparent cover which may be raised to permit easy access to the food but in raised position provides a transparent shield for the food; and to provide such a device which may be readily manufactured and will be effective in use.

In accordance with this invention, a food display device may comprise, in combination, means providing a support for food and the like, a transparent cover, hinge means interconnecting the support and one edge of the cover so that the cover may be raised and lowered about the hinge, with the cover being concave on the underside and preferably having a sufficient height that its center of gravity will be above the hinge while its lower edge is still disposed at a substantial angle to the perpendicular, and stop means for the hinged edge of the cover, so that the cover will rest in an open position with its center of gravity just rearwardly of a point directly above the hinge.

Other novel features of the present invention, together with other and further objects thereof, will become apparent from the following description, taken in connection with the accompanying drawings, in which:

FIG. 3 is a fragmentary perspective view of the upper portion of an alternative type of cart, as for salads or the like;

Figure 1:
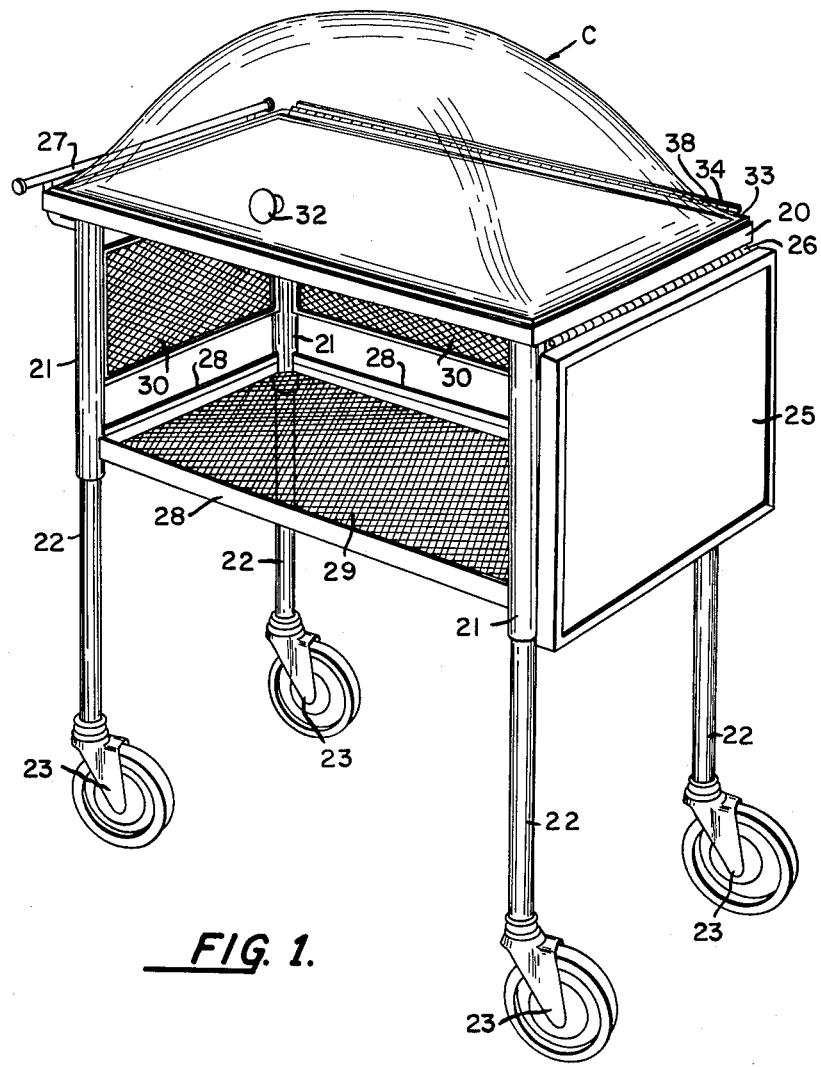
FIG. 1 is a perspective view of a service cart, as for pastries and the like, embodying this invention and having a hinged cover shown in closed position.
Figure 2:
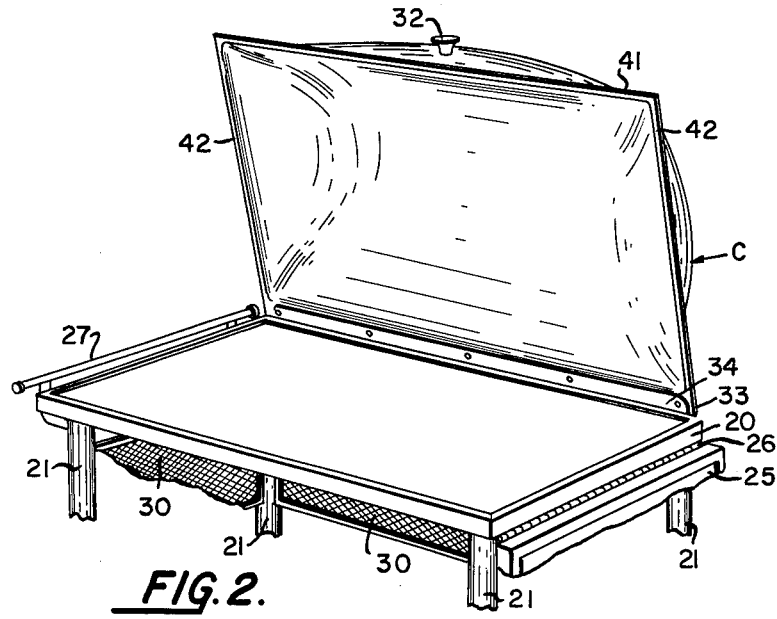
FIG. 2 is a fragmentary perspective view, showing the upper portion of the cart of FIG. 1 with the cover in raised position.
Figure 3:
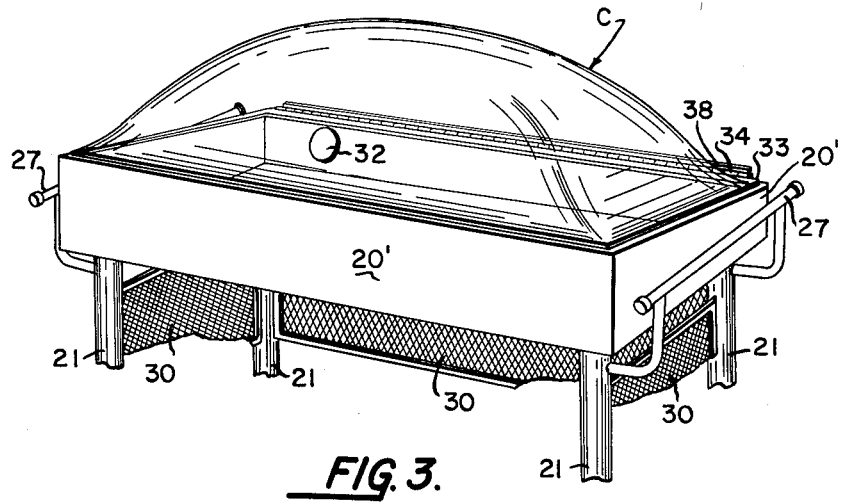
Figure 4:
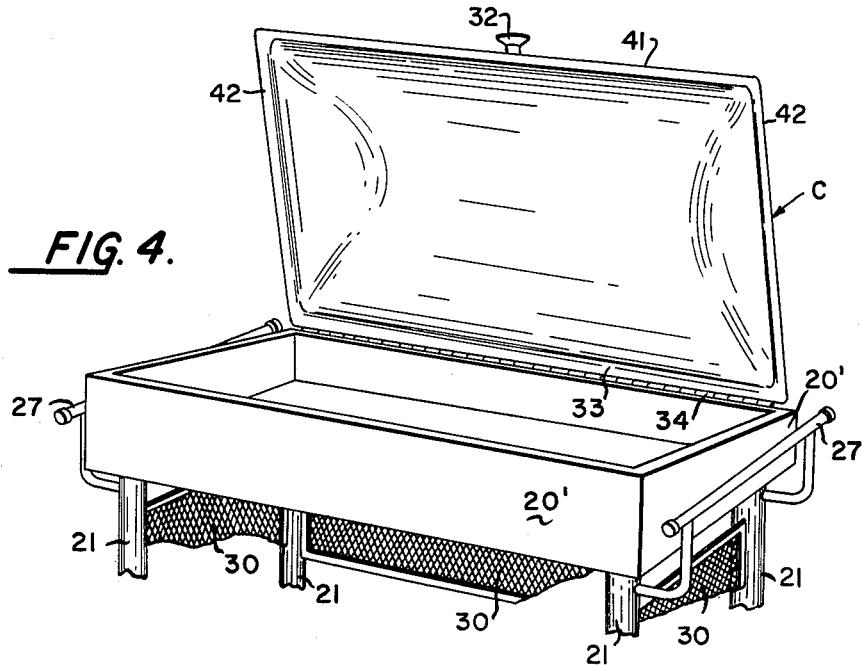
FIG. 4 is a view similar to FIG. 3 with the cover in open position.
Figure 5:
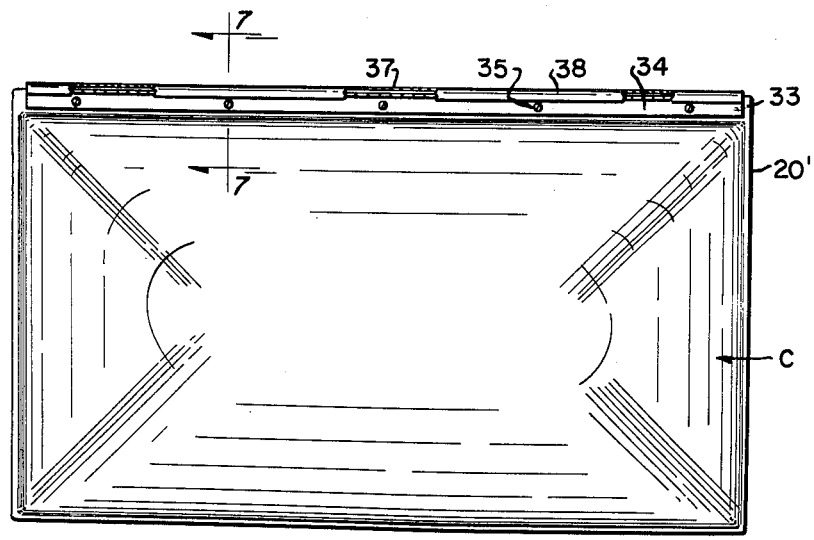
FIG. 5 is a top plan view of the cart of FIG. 3.

Referring to FIG. 1 of the drawings, a food display device constructed in accordance with this invention may include a food support, such as a tray or the rectangular top 20 of a cart having extensible depending legs. The legs and the remainder of the cart may be constructed in any suitable manner, the legs as shown each comprising a stub tube 21 rigidly attached to the respective corners of top 20, with extension members 22 slidably mounted within tubes 21. Each member 22 may be held within a tube 21 at a preselected position, as by set screws or other suitable means. Each extension member 22 may conveniently be provided with a caster 23 for mobility, while top 20 may be provided with a leaf 25 hingedly attached to either or both ends thereof, as by a hinge 26. A handle 27 may be attached to the opposite end of top 20, as by securing the handle to stub tubes 21 by suitable means. A shelf may be provided below top 20, as by securing angles 28 between stub tubes 21 by suitable means and supporting wire mesh 29 or other suitable shelving material thereon. The shelf may be closed on three sides by means of wire mesh 30 or other suitable means secured between stub tubes 21. The parts described above are, for sanitary purposes, formed of stainless steel, brass, bronze, or other metal or material adapted to resist corrosion. The top of the cart of FIGS. 1 and 2 is particularly adapted to receive pastries and the like, for display purposes, while the shelf may receive dishes or an additional supply of pastries and the like. When food such as certain salads or sea foods, which require cooling, are to be displayed for selection, a cart such as shown in FIGS. 3–5 may be used, which is provided with a tray 20' adapted to receive crushed ice on which plates containing the salads or the like may be placed. Tray 20' is deeper than top 20 and may be shallower at the hinge edge than at the edge away from the hinge, which permits a quantity of ice to be held and sloped toward the hinge. The cart of FIGS. 3–5 may be otherwise similar to the cart of FIGS. 1 and 2, although a handle 27 may be provided at each end.

Figure 6:
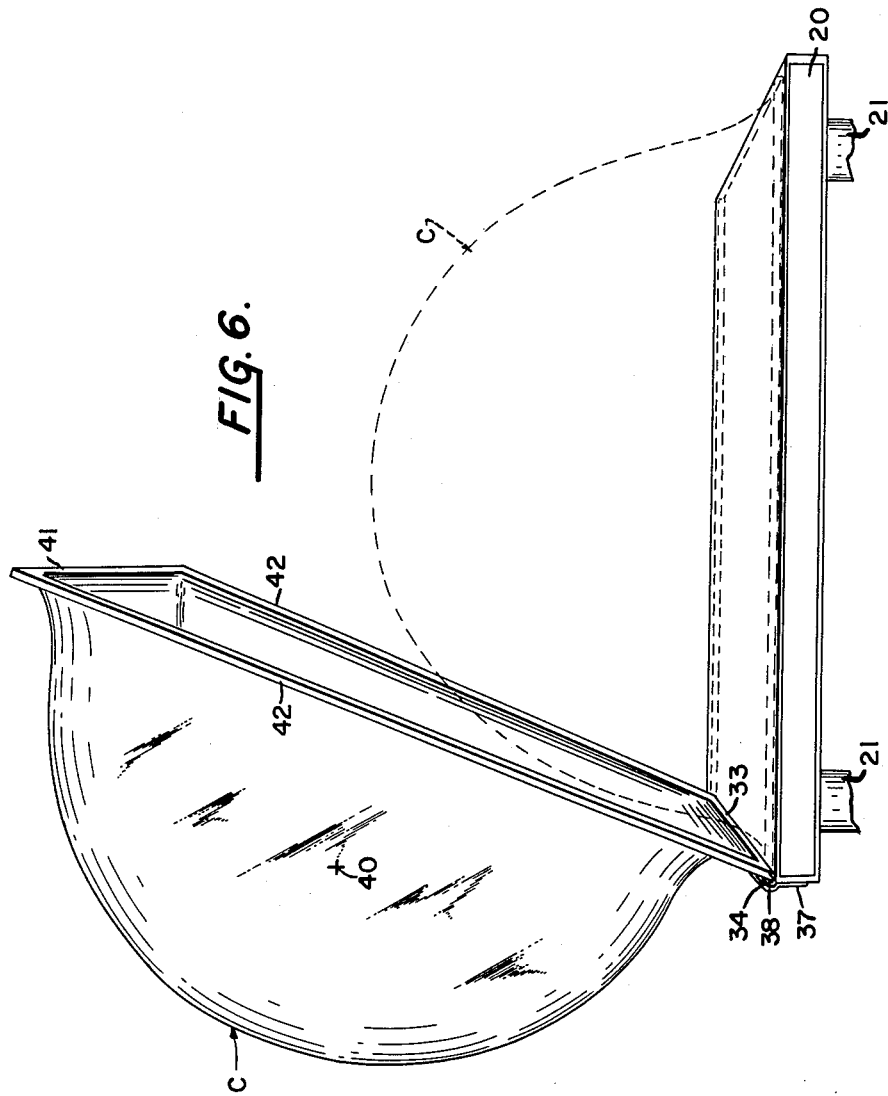
FIG. 6 is an enlarged end perspective view of the cover and upper portion of the cart shown in FIG. 2, with the closed position of the cover shown in dotted line.
Figure 7:
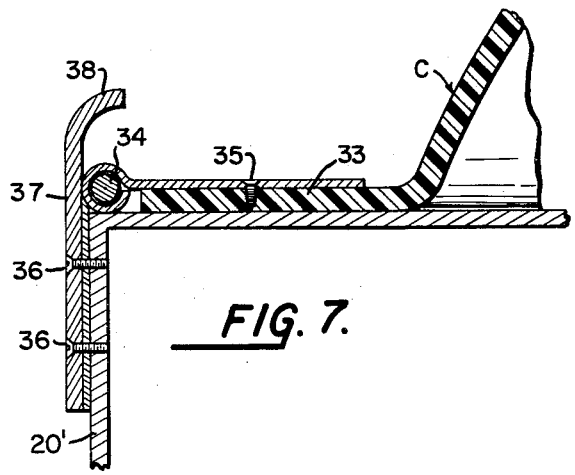
FIG. 7 is a fragmentary, enlarged section taken along line 7—7 of FIG. 5.

Top 20 and top 20' are each provided with a transparent plastic shield or cover C, which derives important characterisitics from its manner of forming, as specified later, since it is an important aspect of the invention that cover C be transparent to permit visual inspection of food on top 20 or tray 20' and also that an undistorted view of the food be produced. Cover C is adapted to be raised, as by a handle or knob 32, from the closed position of FIG. 1 or FIG. 3 to the open position of FIG. 2 or FIG. 4, i.e., from the dotted to the full position of FIG. 6, and remain in the open position without undue stress on a rear flange 33 of the cover, at which the cover may be attached to a hinge 34 which is also attached to the front edge of top 20. Hinge 34 may be a piano-type hinge and one-half thereof may be fastened to rear flange 33 of cover C and the other half to top 20 or 20' by suitable fasteners, such as screws 35 and 36, respectively, of FIG. 7. A stop 37 having a rearwardly extending, upper lip 38, adapted to engage the half of hinge 34 attached to cover C may also be attached to top 20 by screws 36, as in FIG. 7. It is to be understood that stop 37 may be an integral part of hinge 34 or separate, as shown. It is a further important characteristic of the cover C that its center of gravity, such as at point 40 of FIG. 6, be located at a position approximately midway between its top and bottom, so that when hinge 34 engages the lip 38 of stop 37, the center of gravity will be above a point slightly forwardly of the pivot center of hinge 34. Thus, cover C may be raised to an upright position and remain in this position without undue stress, due to overhanging weight, on flange 33. Since the weight of front flange 33, as well as rear flange 41 and side flanges 42, of the cover C, is concentrated at the lower or rear edge of the tray, i.e., the lower edge with the cover in closed position or the rear edge with the cover in open position, and for adequate protection of the food on top 20 or tray 20', the rear edge of the cover should remain at a substantial angle to the perpendicular, such as shown in FIG. 6, the height of the cover should be sufficient to permit enough material in the upper portion of the cover to counter-balance the flanges. Also, lip 38 of stop 37 should be so positioned that the cover will assume the desired position when raised against it and the cover flange 33 will be subjected primarily to compression rather than bending stresses. Cover C conveniently is formed from a sheet of transparent plastic having thermoplastic properties. Among these plastics suitable for this purpose are "Lucite," a series of acrylic resins, and "Plexiglas," a cast acrylic resin available in thermoplastic sheets.

Figure 8:
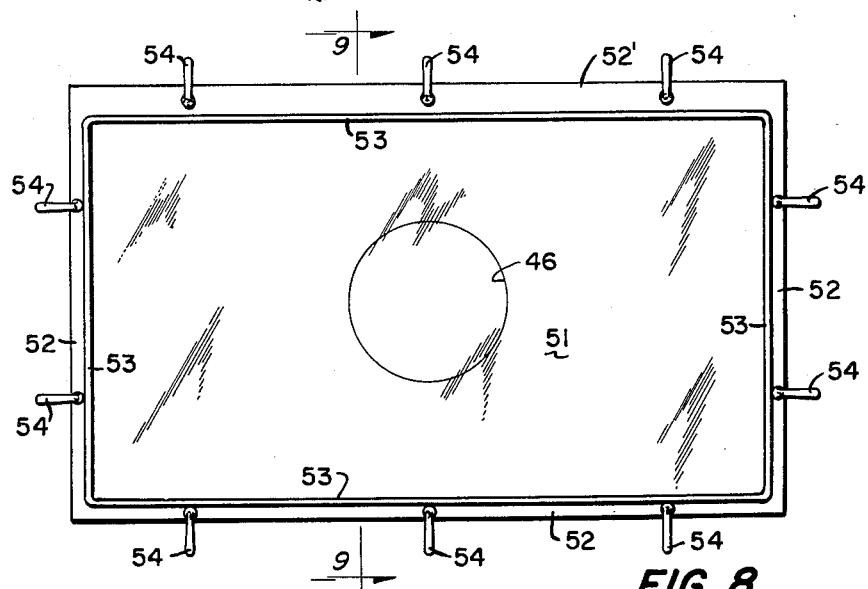
FIG. 8 is a top plan view of a clamping jig for forming the transparent cover.
Figure 9:
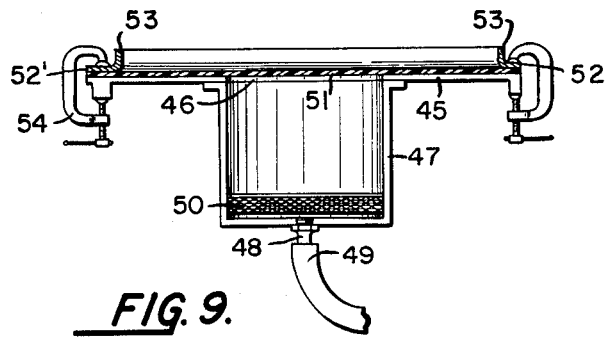
FIG. 9 is a transverse section taken along line 9—9 of FIG. 8.

The jig shown in FIGS. 8 and 9 is particularly adapted to form a cover C with the required characteristics and comprises a flat table 45 having a central aperture 46, with an open top chamber 47 secured in air tight relation to the underside of table 45 with the open top in registry with aperture 46. Chamber 47 is provided with an inlet 48 at the bottom, adapted to be connected with a source of air under pressure, as through a hose 49, while a filter element 50 may be positioned in chamber 47 to filter and remove dust or foreign particles introduced into the chamber from the source of air pressure. A sheet of plastic 51 is placed on table 45 and a generally rectangular rim 52, having upturned inner flanges 53 and a greater flange width along edge 52', is positioned to contact the outer extremities of the sheet. A plurality of clamps 54, spaced around the edges of table 45, may be tightened to bear on rim 52 and clamp plastic sheet 51 into air tight contact with table 45. Heat is applied to plastic sheet 51, as from a torch, until the softening temperature is reached, while air is introduced into chamber 47 through hose 49 and inlet 48. The introduction of air and the application of heat are continued until a bubble of sufficient height is formed, to provide a shape such as shown in FIG. 1. The plastic sheet, thus blown, is allowed to cool, removed from the jig and the edges trimmed to size. As will be evident from FIG. 9, the inner rounded edges and upwardly directed flanges 53 of rim 52 produce a smooth curve between the bubble and the clamped edge of the sheet, which remains in the plane of the original sheet, the clamped edges forming the peripheral flanges 33, 41 and 42, with flange 33 produced along rim edge 52', conveniently having a greater width to facilitate fastening hinge 34 thereto. The plastic bubble formed in the above manner is essentially devoid of optical distortion and permits ready visibility therethrough, since except where contacted by rim 52, the plastic is free to expand in any direction and thus stresses are relieved as they occur. The shape thereof is seen to conform to a family of isobars, as each point on the plastic sheet is subjected to the same pressure as every other point. Alo, any reduction in thickness, as a result of the forming, does not produce optical distortion. This manner of forming cover C from a single sheet of plastic is not only more economical than conventional molding, using a die, but produces a cover essentially devoid of optical distortion, a degree not attainable with conventional molding technique.

Figure 10:
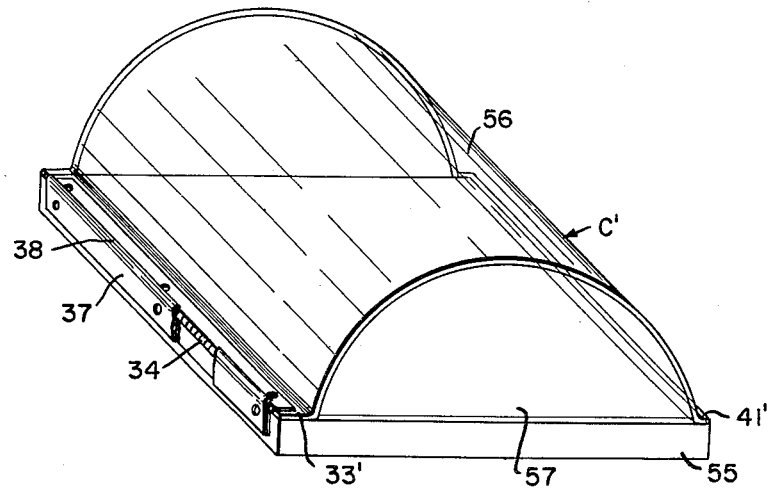
FIG. 10 is a perspective view of another embodiment of a device constructed in accordance with this invention, including a tray and an alternative style of cover.
Figure 11:
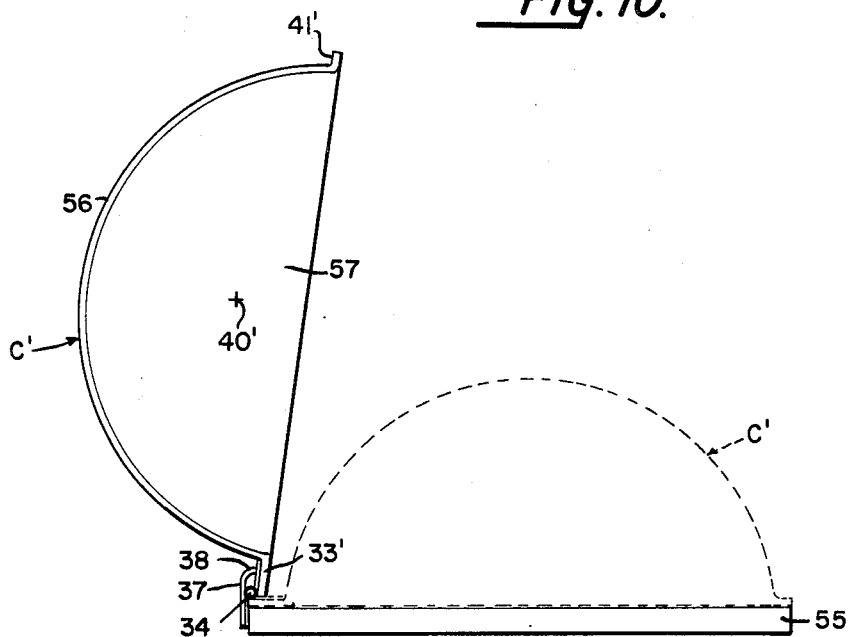
FIG. 11 is a side view of the device of FIG. 10, with the cover in open position.

In another form of device of this invention, shown in FIGS. 10 and 11, a cover C' may be attached by a front flange 33' to one half of a hinge 34, the opposite half of which, along with a stop 37 having a lip 38, as before, may be attached to one edge of a tray 55. Cover C' may comprise a semi-cylindrical section 56 of transparent plastic formed or molded to shape to provide a rear flange 33' and a front flange 41', which rests on the edge of tray 55 opposite hinge 34 with the cover in closed position, as in FIG. 10. Or, section 56 may be cut from a clear tubular cylinder and flanges 33' and 41' then bent at the respective edges. It will be noted that, when molding a semi-cylindrical section, there is more opportunity for stresses to be relieved during molding, since bending takes place in only one direction, so that the probability of producing optical distortion is less than if cover C where formed by molding. Semi-circular ends 57 of a similar plastic, conveniently formed by cutting from a plate or sheet, may be cemented within the ends of section 56. As before, stop lip 38 is positioned to permit cover C' to move slightly past dead center, on being raised from the dotted to the full position of FIG. 11, and remain in this position, by the action of gravity, until lowered. As before, the center of gravity 40' of cover C' is preferably located so that, in its open position and with the rear edge of the hood still at a sufficient angle to the perpendicular that adequate protection to the food on tray 55 will be secured, the weight of the hood will be substantially downward on flange 33', rather than producing a bending movement.

The position of the center of gravity 40', for the cover C', may be determined by calculation. If the thickness of the plastic forming section 56 and the ends 57 are the same, it may be considered as unity and disregarded further in the calculation, but if the thickness of section 56 and the ends 57 differ, then that factor should be taken into account. Considering $r$ to be the inner radius of section 56 and $t$ to be its thickness, the center of gravity of each of the semi-circular ends will be located at a point $0.4244r$ from the center of the rear or lower edge of the cover, while the center of gravity of the semi-cylindrical top portion will be located at a point $$\frac{0.6366}{\left(r+\frac{t}{2}\right)}$$

from the same point, and the center of gravity of flanges 33' and 41' will be located at points a distance of $$\frac{t}{2}$$

from the rear edge of the cover. Considering the width of flange 33' to be $w$ and the width of flange 41' to be $w_1$, the center of gravity of flanges 33' would be $$r+\frac{w}{2}$$

from the center line to one side and the center of gravity of flange 41' would be $r+w_1$, to the other side. However, the weight of the flanges, without appreciable error, may be considered as concentrated at the center and the center of gravity would then be at $$\frac{t}{2}$$

Also, the weight of each end will be proportional to $$\frac{\pi r^2 t}{2}$$

and the weight of both ends will be $\pi r^2$. Considering L to be the length of section 56, the weight thereof will be proportional to $\pi r L$, while the weight of flange 33' would be proportional to $Lw$ and the weight of flange 41' proportional to $Lw_1$. Thus, the following formula may be deduced, for calculating the distance of the center of gravity, or c.g., from the center of the lower or rear edge of the cover:

$$c.g. = \frac{\frac{t}{2}L(w+w_1) + 0.6366\pi L\left(r+\frac{t}{2}\right)^2 + 0.4244\pi r^3}{L(w+w_1) + \pi L\left(r+\frac{t}{2}\right) + \pi r^2}$$

The center of gravity of cover C may be determined by similar but somewhat more complicated calculations, due to the configuration of the upper portion of the cover. As will be evident, the center of gravity will be shifted outwardly by an increase in the length of the cover, with the radius remaining the same. Also, for a wider cover, i.e., having a greater value for $r$, the center of gravity will also be shifted outwardly. As will also be evident, if the cover C or C′ were flat rather than concave, it would be much less stable in its raised position.

From the foregoing, it will be evident that the invention fulfills to a marked degree the objects and requirements hereinbefore set forth. Although the invention has been described in connection with a food tray and a display device in the form of a cart, it will be understood that the invention is equally applicable to other forms of food display devices.

While certain preferred embodiments of this invention have been illustrated and described, it will be evident that other embodiments may exist and that various other changes and modifications may be made, all without departing from the spirit and scope of this invention.

What is claimed is:

1. A food display device comprising, in combination, a generally horizontal support for food; a concave, transparent plastic cover for said support and having a peripheral surface adapted to engage said support in closed position, said cover including a rearwardly extending integral plastic flange; hinge means directly pivotally connecting said flange to one edge of said support, so that said cover may be raised and lowered about said hinge means, between a down position forming an enclosure for food articles on said support and a raised position providing access to said articles, but forming an upright transparent wall above said hinge means; and stop means associated with said hinge means and arranged to arrest movement of said cover at an upright position of said cover in which the center of gravity of said cover is slightly rearwardly past dead center relative to said hinge means and said peripheral surface is disposed at an acute angle to said support, so that the bending moment about said flange is negligible.

2. A food display device as set forth in claim 1, wherein said cover includes a plastic bubble in a shape conforming to a family of isobars and said bubble is substantially devoid of optical distortion.

3. A food display device as set forth in claim 1, wherein said cover includes a transparent generally semi-cylindrical central section and transparent generally semi-circular ends attached to the opposite ends of said central section.

4. A food display device comprising, in combination, a generally horizontal support for food; a concave, elongated, transparent plastic cover for said support having a generally rectangular peripheral surface adapted to engage said support in closed position, said cover including a rearwardly extending integral plastic flange having substantially the same thickness as the body portion of said cover; hinge means directly pivotally connecting said flange along one edge of said support, so that said cover may be raised and lowered about said hinge means between a down position forming an enclosure for food articles on said support and a raised position providing access to said articles, but forming a transparent wall above said hinge means and extending forwardly over at least a portion of said support; and a stop extending upwardly from a position rearwardly of the pivotal axis of said hinge means and then forwardly of said pivotal axis to a position to arrest movement of said cover in said raised position wherein the center of gravity of said cover is slightly rearwardly past dead center relative to said hinge means, so that the bending moment about said flange is negligible and said peripheral surface is disposed at an acute angle to said support.

References Cited in the file of this patent

UNITED STATES PATENTS

| | | |
|---|---|---|
| D. 11,058 | Brown | Mar. 11, 1879 |
| 431,459 | Griswold | July 1, 1890 |
| 774,170 | Frey | Nov. 8, 1904 |
| 1,380,587 | Phillips | June 7, 1921 |
| 1,920,882 | Pellow | Aug. 1, 1933 |
| 2,027,498 | Sperlich | Jan. 14, 1936 |
| 2,200,748 | Keil | May 14, 1940 |
| 2,367,642 | Helwig | Jan. 16, 1945 |
| 2,631,912 | Pryor | Mar. 17, 1953 |
| 2,646,332 | Philipp | July 21, 1953 |
| 2,667,397 | Hallisey | Jan. 26, 1954 |
| 2,692,808 | Marsh | Oct. 26, 1954 |
| 2,694,227 | Fordyce et al. | Nov. 16, 1954 |

FOREIGN PATENTS

| | | |
|---|---|---|
| 207,701 | Switzerland | Feb. 16, 1940 |